US005551069A

United States Patent [19]

Harrison et al.

[11] Patent Number: 5,551,069

[45] Date of Patent: Aug. 27, 1996

[54] RADIO APPARATUS HAVING A COMBINED ANTENNA AND CLIP

[75] Inventors: Peter D. Harrison, Ascot; Sarah Hodgkinson, Chelmsford, both of England

[73] Assignee: Nokia Mobile Phones Ltd., Salo, Finland

[21] Appl. No.: 101,427

[22] Filed: Aug. 2, 1993

[30] Foreign Application Priority Data

Aug. 5, 1992 [GB] United Kingdom .................. 9216640

[51] Int. Cl.$^6$ ...................................................... H04B 1/38

[52] U.S. Cl. .............................. 455/90; 455/97; 455/128; 455/129; 379/433; 343/702

[58] Field of Search ................................ 455/89, 90, 117, 455/128, 129, 114, 97; 343/702, 841, 900, 901, 897, 912; 379/58, 424, 431, 433

[56] References Cited

U.S. PATENT DOCUMENTS

| | | |
|---|---|---|
| 3,956,701 | 5/1976 | James, Jr. et al. . |
| 4,471,493 | 9/1984 | Schober . |
| 4,654,631 | 3/1987 | Kurcbart et al. . |
| 4,969,180 | 11/1990 | Watterson et al. ........................ 455/74 |
| 4,989,012 | 1/1991 | Martensson et al. .................. 343/900 |

FOREIGN PATENT DOCUMENTS

| | | |
|---|---|---|
| 0036442 | 9/1981 | European Pat. Off. . |
| 0036442A1 | 9/1981 | European Pat. Off. . |
| 0205225 | 12/1986 | European Pat. Off. . |
| 0508299 | 10/1992 | European Pat. Off. . |
| 1878845 | 11/1962 | Germany . |
| 3101198 | 9/1982 | Germany . |
| 0213032 | 8/1989 | Japan ....................................... 455/97 |
| 2137038 | 9/1984 | United Kingdom . |
| WO91/02386 | 2/1991 | WIPO . |

*Primary Examiner*—Andrew Faile
*Attorney, Agent, or Firm*—Perman & Green

[57] ABSTRACT

A radio apparatus, particularly a radio telephone has an antenna which, rather than extending away from the housing of the apparatus, is bent around the housing to overlap it in a clip-like formation. The antenna acts as a fixed antenna to receive and transmit radio signals but is less vulnerable to damage and breakage their conventional fixed antennas. The antenna also acts a clip enabling the apparatus to be clipped over a pocket or belt.

8 Claims, 1 Drawing Sheet

RADIO APPARATUS HAVING A COMBINED ANTENNA AND CLIP

This invention relates to a radio apparatus comprising a housing enclosing a transceiver, and an antenna.

BACKGROUND OF THE INVENTION

A radio apparatus, for example a cellular radio telephone intended for two-way communication, generally operates with either an external fixed rod or plate antenna, a retractable antenna, or with an internal antenna. The fixed rod or plate type of antenna has a predetermined length. Whilst such antennas can be relatively short, they are not conducive to a compact design nor are they particularly suitable for a radio intended to be carried in a pocket or other receptacle offering restricted space. In rod antennas, the elongate radiating element generally has a flexible construction so that it simply bends if it is subject to any force. Nevertheless, the antenna remains relatively vulnerable and it is a problem that the antenna is liable to break. This ordinarily necessitates replacing the whole antenna assembly including the (otherwise operative) impedance matching network, which can be relatively expensive. The position of the antenna also makes the telephone less compact and more difficult to stow away.

In EP-A-0036442 there is disclosed a personal radio transceiver in which a pivoted antenna is movable between an extended operating position and a retracted non-operating position, and, which, in the non-operating position, doubles as a pocket clip. In the operating position the antenna is connected to the antenna terminal of the transmitter and in the non-operating position, the antenna is connected to the antenna terminal of the receiver so as to enable the transceiver to receive radio signals. However, in order to transmit a radio signal, the antenna must be in the extended operating position which means the operator must extend the antenna for this with all the attendant problems of a conventional external rod antenna.

SUMMARY OF THE INVENTION

According to the present invention, there is provided a radio apparatus comprising a housing having a first end and a second end, said housing enclosing a transceiver, and an antenna comprising a radiating element fixedly fastened to the housing and permanently coupled to the transceiver wherein at least a portion of the radiating element overlaps a portion of the housing between said first end and said second end in a clip-like configuration.

A radio apparatus in accordance with the invention has the advantage of providing a compact antenna which is operable to receive and transmit signals while in this clip-like configuration i.e. it operates as a conventional external antenna without the need to move or extend it to an operating position and, it is also less prone to breakage. At the same time, the antenna has the additional function of a belt or pocket clip.

BRIEF DESCRIPTION OF THE DRAWINGS

An embodiment of the invention will now be described, by way of example only, with reference to the accompanying drawings.

DETAILED DESCRIPTION OF THE INVENTION

Figure 1:
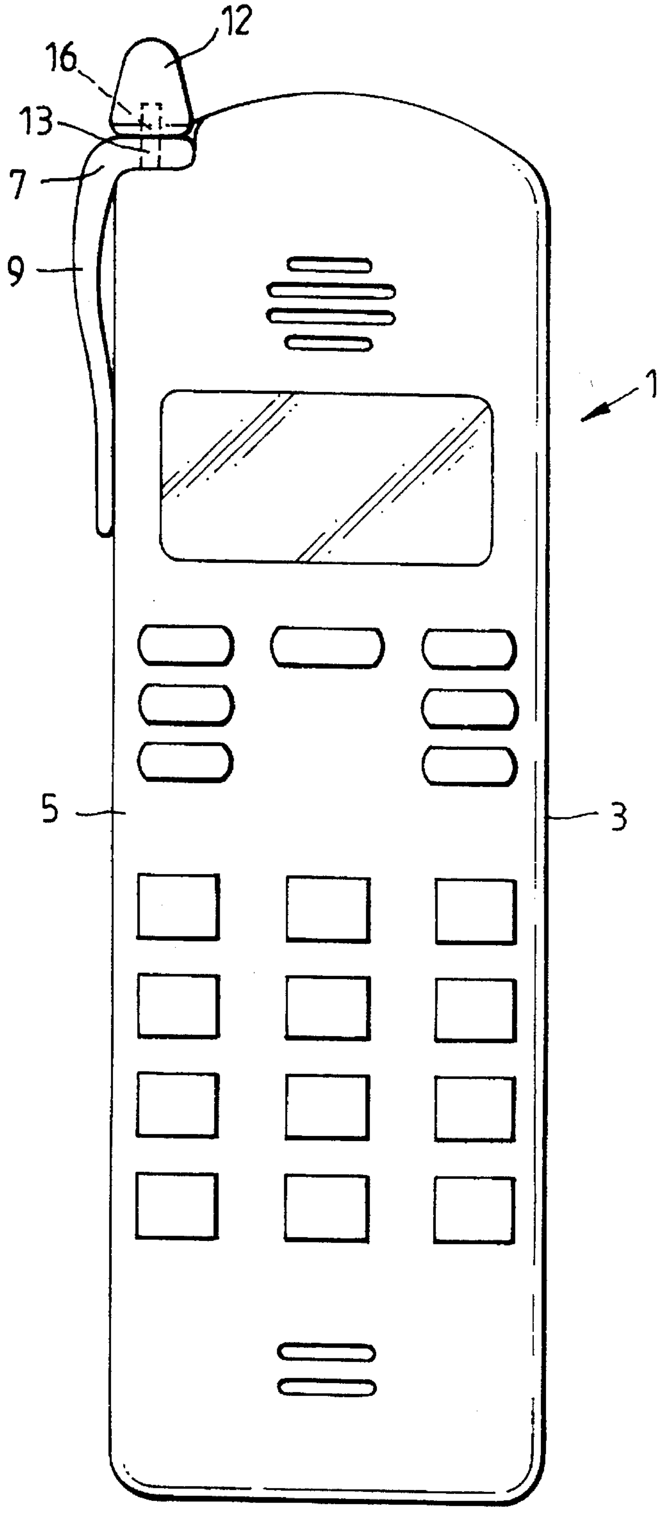
FIG. 1 is a front view of a telephone in accordance with the invention.
Figure 2:
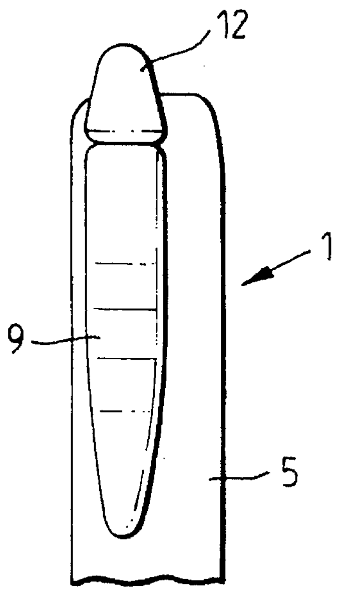
FIG. 2 is a partial side view showing the top portion of the telephone of FIG. 1.

As shown in FIGS. 1 and 2 a handheld portable radio telephone 1 comprises a housing 3 having a main body portion 5 which encloses substantially the whole of the electronic circuitry of the telephone including a transceiver (not shown) and all other features conventionally found in such telephones. These features are well known to a person skilled in the art and are therefore not described herein as they are not relevant to the present invention. The main housing 3 is made for example, of an insulating plastics material. A layer of metallization (not shown), connected to ground potential, is provided on the internal faces of the main housing 3.

As in conventional radio telephones, the telephone is provided with an antenna 7, for coupling signals to and from the transceiver by means of suitable impedance matching circuitry as is well known to persons skilled in the art.

The antenna 7 comprises a radiating element 9, which is chosen to have an appropriate electrical length, for example, one quarter wavelength. The elongate radiating element 9 is made of any suitable conducting material of low radio frequency (RF) loss, for example, spring steel.

The conductor may be covered with a plastic coating for aesthetic and styling reasons.

Figure 3:
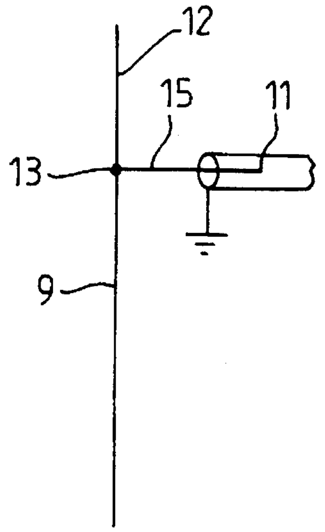
FIG. 3 is a diagram illustrating the coupling of the antenna to the transceiver circuitry of a radio telephone.

As illustrated in FIG. 3, and as is conventional, the radiating element 9 is coupled to the transceiver by means of a coaxial cable 11 by electrically coupling one end of the radiating element 9 to the inner conductor 15 of the coaxial cable 11. The ground connection for the coaxial cable 11 may be made through the layer of metallization of the telephone housing 3, or by internal metalwork e.g. the shields in the telephone.

The radiating element 9 is fixedly fastened at one end to the housing 3, as shown in FIGS. 1 and 2.

Rather than extending generally upwards away from the telephone housing 3, the radiating element 9 is bent or configured in a curved manner so as to run substantially alongside the telephone housing 3 so that a portion of the radiating element 9 overlaps a portion of the upper part of the main body portion 5 of the housing 3 from the top of the telephone 1 as shown in FIG. 1. At the end of the radiating element 9 fastened to the housing 3, the radiating element 9 is formed into a collet 13 to fit around a pin 16. The pin 16 is made of an electrically conductive material and not only acts to assist in fastening the radiating element 9 to the housing 3 but to electrically couple the radiating element 9 to the coaxial cable 11.

A button 12 is provided on the top of the telephone housing 3 to mechanically aid the connection of the radiating element 9 to the housing 3 by fitting over the pin 16 and clamping the radiating element 9 at the collet 13 between the button 12 and the housing 3. The inside of the button 12 and the pin 13 could have cooperating screw threads to keep the button 12 in place, or other suitable couplings could be used. The button 12 may house components which are electrically integrated with the radiating element 9 i.e. electrically coupled thereto, to extend the electrical length of the radiating element 9. In this case, the "button" section 12 of the radiating element 9 could comprise or contain a helical antenna or be of the same structure as the rest of the radiating element, covered with a covering which is styled as a button.

As can be seen from FIGS. 1 and 2, the button 12 extends substantially away from the housing 3 in the opposite direction to the curved radiating element 9.

Where the button 12 contains components electrically coupled to the radiating element, the parameters are chosen to optimize the feedpoint impedance. This is illustrated schematically in FIG. 3.

Because of the general cantilevered configuration of the radiating element 9 and because of the nature of the material from which the radiating element is made e.g. spring steel as discussed above, the radiating element is resiliently biased towards the housing and can act as a pocket or belt clip enabling the user to clip the phone onto the side of a pocket or over a belt when not in use. However, it still operates as an antenna and does not need to be manipulated into an operating position.

It will be evident to a person skilled in the art, from the foregoing description, that various modifications are possible within the scope of the present invention.

For example, the antenna length can be other than one-quarter wavelength.

The radiating element 9 does not have to be resiliently biased towards the housing as it can act as a clip by simply being bent or configured to overlap the telephone housing 3.

Although the Figures show the radiating element 9 overlapping the housing 3 at the side, it could also run down the back of the telephone housing 3.

The telephone could also be provided with a retractable antenna which could be integrated with the button 12 to provide increased flexibility and operating efficiency.

What we claim is:

1. A radio apparatus comprising a housing having a first end and a second end, said housing enclosing a transceiver, and an antenna comprising a first radiating element, said first radiating element having a first end that is stationarily fixedly fastened to the housing and permanently coupled to the transceiver for transmitting and receiving radio signals without moving the first radiating element wherein a substantially stationary portion of the first radiating element overlaps a portion of the housing between said first and second ends of said housing which is deflectable in a general cantilever fashion relative to said housing and said first end of said radiating element, said portion of said first radiating element being sized, shaped and positioned relative to the housing to function as a pocket clip for removably attaching said housing to clothing of a user by capturing the clothing between said housing and said portion of said first radiating element.

2. A radio apparatus as claimed in claim 1, wherein the first radiating element is resiliently biased towards the housing.

3. A radio apparatus as claimed in claim 2, wherein the first radiating element comprises a resilient, conductive material.

4. A radio apparatus as claimed in claim 1, wherein the antenna comprises retaining means for fastening the antenna at said first end to the housing.

5. A radio apparatus as claimed in claim 4, wherein the retaining means includes a housing comprising a second radiating element electrically coupled to the first radiating element.

6. A radio apparatus as claimed in claim 1, wherein the first radiating element is substantially bow-shaped in cross-section.

7. A radio apparatus comprising a housing having a first end and a second end, said housing enclosing a transceiver, and an antenna comprising a radiating element, the antenna having a first end that is stationarily fastened directly onto the housing with the radiating element permanently coupled to the transceiver for transmitting and receiving radio signals without moving the radiating element wherein at least a substantially stationary portion of the radiating element overlaps a portion of the housing between said first and second ends of said housing, wherein said substantially stationary portion is deflectable relative to the first end of the antenna and said housing in a general cantilever fashion and is sized, shaped and positioned relative to the housing to function as a pocket clip for removably capturing clothing of a user between said housing and said portion of said radiating element.

8. A radio apparatus comprising a housing having a first end and a second end, said housing enclosing a transceiver, and an antenna comprising a substantially stationary radiating element having a first end fixedly fastened to the first end of the housing and, permanently operably coupled to the transceiver for transmitting and receiving radio signals without moving the radiating element, wherein at least a portion of the radiating element has a general cantilever shape that overlaps a portion of the housing between said first and second ends of said housing, wherein said radiating element portion has a cantilevered second end that is biased against said housing, said radiating element portion being slightly deflectable relative to said first end of said radiating element in a general cantilever fashion for removably capturing clothing of a user between said housing and said second cantilevered end.

* * * * *